US012789464B2

(12) United States Patent
McCarthy et al.

(10) Patent No.: US 12,789,464 B2
(45) Date of Patent: Nov. 10, 2026

(54) ADDITIVE MANUFACTURING SYSTEMS AND METHODS INCLUDING BUILD CHARACTERISTIC CONTRIBUTION PROFILE

(71) Applicant: General Electric Company, Schenectady, NY (US)

(72) Inventors: Brian Scott McCarthy, Schenectady, NY (US); Aymeric Moinet, Schenectady, NY (US); Evan John Dozier, Greenville, SC (US); Sathyanarayanan Raghavan, Ballston Lake, NY (US); Michael Evans Graham, Slingerlands, NY (US); Tyler Nathaniel Nelson, Schenectady, NY (US); Rajesh Kartik Bollapragada, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 658 days.

(21) Appl. No.: 16/943,793

(22) Filed: Jul. 30, 2020

(65) Prior Publication Data

US 2022/0032549 A1 Feb. 3, 2022

(51) Int. Cl.
*B29C 64/393* (2017.01)
*B33Y 10/00* (2015.01)
(Continued)

(52) U.S. Cl.
CPC ............ *B29C 64/393* (2017.08); *B33Y 10/00* (2014.12); *B33Y 50/02* (2014.12); *G06F 30/17* (2020.01); *G06F 2113/10* (2020.01)

(58) Field of Classification Search
None
See application file for complete search history.

(56) References Cited

U.S. PATENT DOCUMENTS 9,696,142 B2 7/2017 Bamberg et al.
9,815,118 B1 11/2017 Schmitt et al.
(Continued)

FOREIGN PATENT DOCUMENTS

CN 104084584 B 12/2015
JP 2017179517 A 10/2017
(Continued)

OTHER PUBLICATIONS

Mustafa Megahed et al., "Metal Additive-Manufacturing Process and Residual Stress Modeling", Integrating Materials and Manufacturing Innovation, pp. 1-33, Feb. 2016.
(Continued)

*Primary Examiner* — Ryan F Pitaro
*Assistant Examiner* — Bernard E Cothran
(74) *Attorney, Agent, or Firm* — Hanley, Flight & Zimmerman, LLC

(57) ABSTRACT

An additive manufacturing system includes a control system communicatively coupled to a consolidation device and configured to control operation of the consolidation device. The control system is configured to generate a model of a component. The model includes a plurality of elements and at least one region of interest. The control system is also configured to apply a strain load to at least one element of the plurality of elements and generate a build characteristic contribution profile for at least one element of the plurality of elements. The build characteristic contribution profile represents an effect of the strain load applied to the at least one element on a build characteristic of at least one location within the at least one region of interest. The control system is further configured to adjust a build parameter for a location within the component relating to the at least one element of the plurality of elements based on the build characteristic contribution profile.

20 Claims, 7 Drawing Sheets

(51) Int. Cl.

| | |
|---|---|
| ***B33Y 50/02*** | (2015.01) |
| ***G06F 30/17*** | (2020.01) |
| ***G06F 113/10*** | (2020.01) |

(56) References Cited

U.S. PATENT DOCUMENTS

| | | | | |
|---|---|---|---|---|
| 9,999,924 | B2 | 6/2018 | Dave et al. | |
| 10,183,330 | B2 | 1/2019 | Buller et al. | |
| 10,207,454 | B2 | 2/2019 | Buller et al. | |
| 10,286,603 | B2 | 5/2019 | Buller et al. | |
| 10,307,823 | B1 * | 6/2019 | Deaton, Jr. | B29C 64/153 |
| 10,409,933 | B2 | 9/2019 | Komzisk | |
| 11,169,504 | B2 * | 11/2021 | Radjou | G05B 19/4099 |
| 2016/0246908 | A1 * | 8/2016 | Komzsik | B29C 67/00 |
| 2017/0197278 | A1 | 7/2017 | Garry et al. | |
| 2017/0232515 | A1 | 8/2017 | Demuth et al. | |
| 2018/0161875 | A1 | 6/2018 | Buller et al. | |
| 2018/0356778 | A1 * | 12/2018 | Acharya | G05B 17/02 |
| 2019/0077077 | A1 | 3/2019 | Martin et al. | |
| 2019/0204810 | A1 * | 7/2019 | Radjou | G06F 30/23 |
| 2019/0232428 | A1 | 8/2019 | Roychowdhury et al. | |

FOREIGN PATENT DOCUMENTS

| | | | | |
|---|---|---|---|---|
| JP | 6645892 B2 | 2/2020 | | |
| WO | 2018233866 A1 | 12/2018 | | |
| WO | 2020019404 A1 | 1/2020 | | |
| WO | WO-2020099038 A1 * | 5/2020 | | B29C 64/493 |

OTHER PUBLICATIONS

Xuan Liang et al., A Modified Inherent Strain Method for Fast Prediction of Residual Deformation in Additive Manufacturing of Metal Parts, Solid Freeform Fabrication 2017: Proceedings of the 28th Annual International Solid Freeform Fabrication Symposium—An Additive Manufacturing Conference, pp. 2539-2545, 2017.

Chen et al., "A Level-Set Based Continuous Scanning Path Optimization Method for Reducing Residual Stress and Deformation in Metal Additive Manufacturing," Department of Mechanical Engineering and Materials Science, University of Pittsburgh, accepted Oct. 29, 2019, 29 pages.

Pellens et al., "Topology Optimization of Support Structure Layout in Metal-Based Additive Manufacturing Accounting for Thermal Deformations," Structural and Multidisciplinary Optimization, Heidelberg, accepted Jan. 17, 2020, 13 pages.

European Patent Office, "European Search Opinion & Extended Search Report," issued in connection with European Patent Application No. 21188038.0, dated Dec. 1, 2021, 11 pages.

Zhang et al., "Defect Formation Mechanisms in Selective Laser Melting," Chinese Journal of Mechanical Engineering, Apr. 2017, 13 pages.

Mugwagwa et al., "Evaluation of the Impact of Scanning Strategies on Residual Stresses in Selective Laser Melting," The International Journal of Advanced Manufacturing Technology, Feb. 2019, 10 pages.

European Patent Office, "Extended European Search Report," issued in connection with European Patent Application No. 21187922.6, dated Dec. 2, 2021, 14 pages.

Cheng et al., "On Utilizing Topology Optimization to Design Support Structure to Prevent Residual Stress Induced Build Failure in Laser Powder Bed Metal Additive Manufacturing," Additive Manufacturing, vol. 27, Mar. 9, 2019, 27 Pages.

* cited by examiner

ADDITIVE MANUFACTURING SYSTEMS AND METHODS INCLUDING BUILD CHARACTERISTIC CONTRIBUTION PROFILE

BACKGROUND

The field of the disclosure relates generally to additive manufacturing, and more particularly, to additive manufacturing systems and methods for fabricating a component using a build characteristic contribution profile.

At least some known additive manufacturing systems involve the consolidation of a particulate to fabricate a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and LaserCUSING® systems, fabricate components using a focused energy source, such as a laser device or an electron beam generator, a build platform, and a particulate, such as, without limitation, a powdered metal. (LaserCUSING is a registered trademark of Concept Laser GmbH of Lichtenfels, Germany.)

Additively manufactured components have build characteristics that are influenced by the design and formation of the components during the additive manufacturing process. Accordingly, the build characteristics may vary from desired values in different regions of the components due to variances during the design and formation of the component. For example, some components may include areas of high stress or deformations that could lead to undesirable anomalies in the component. In other embodiments, the build characteristics of the component inhibit the formation of a desired anomaly in a region of interest. In at least some known systems, models of the components are evaluated to locate areas having high stress or deformations. Based on the evaluated models, the build parameters of the entire component or the region of interest are modified to influence the build characteristics of the region of interest. However, altering the build parameters of the entire component or the region of interest may have an undesirable effect on the build characteristics (e.g., an increase in the stress or deformation of the region of interest).

Accordingly, there is a need for systems that facilitate localized control of build characteristics of additively manufactured components in comparison to conventional systems.

BRIEF DESCRIPTION

In one aspect, an additive manufacturing system is provided. The additive manufacturing system includes a control system communicatively coupled to a consolidation device and configured to control operation of the consolidation device. The control system is configured to generate a model of a component. The model includes a plurality of elements and at least one region of interest. The control system is also configured to apply a strain load to at least one element of the plurality of elements and generate a build characteristic contribution profile for the at least one element of the plurality of elements. The build characteristic contribution profile represents an effect of the strain load applied to the at least one element on a build characteristic of at least one location within the at least one region of interest. The control system is further configured to adjust a build parameter for a location within the component relating to the at least one element of the plurality of elements based on the build characteristic contribution profile.

In another aspect, a method of fabricating a component is provided. The method includes generating a model of the component. The model includes a plurality of elements and at least one region of interest. The method also includes applying a strain load to at least one element of the plurality of elements and generating a build characteristic contribution profile for the at least one element of the plurality of elements. Each build characteristic contribution profile represents an effect of the strain load applied to the at least one element on a build characteristic of at least one location within the at least one region of interest. The method further includes adjusting a build parameter for a location within the component relating to the at least one element of the plurality of elements based on the build characteristic contribution profile.

In yet another aspect, a build characteristic contribution evaluation module for an additive manufacturing system is provided. The build characteristic contribution evaluation module includes at least one processor in communication with at least one memory device, the at least one processor is programmed to generate a model of a component. The model includes a plurality of elements and at least one region of interest. The build characteristic contribution evaluation module is also configured to apply a strain load to at least one element of the plurality of elements, and generate a build characteristic contribution profile for the at least one element of the plurality of elements. The build characteristic contribution profile represents an effect of the strain load applied to the at least one element on a build characteristic of at least one location within the at least one region of interest. The build characteristic contribution evaluation module is further configured to adjust a build parameter for a location within the component relating to the at least one element of the plurality of elements based on the build characteristic contribution profile.

DRAWINGS

These and other features, aspects, and advantages of the present disclosure will become better understood when the following detailed description is read with reference to the accompanying drawings in which like characters represent like parts throughout the drawings, wherein.

Figure 1:
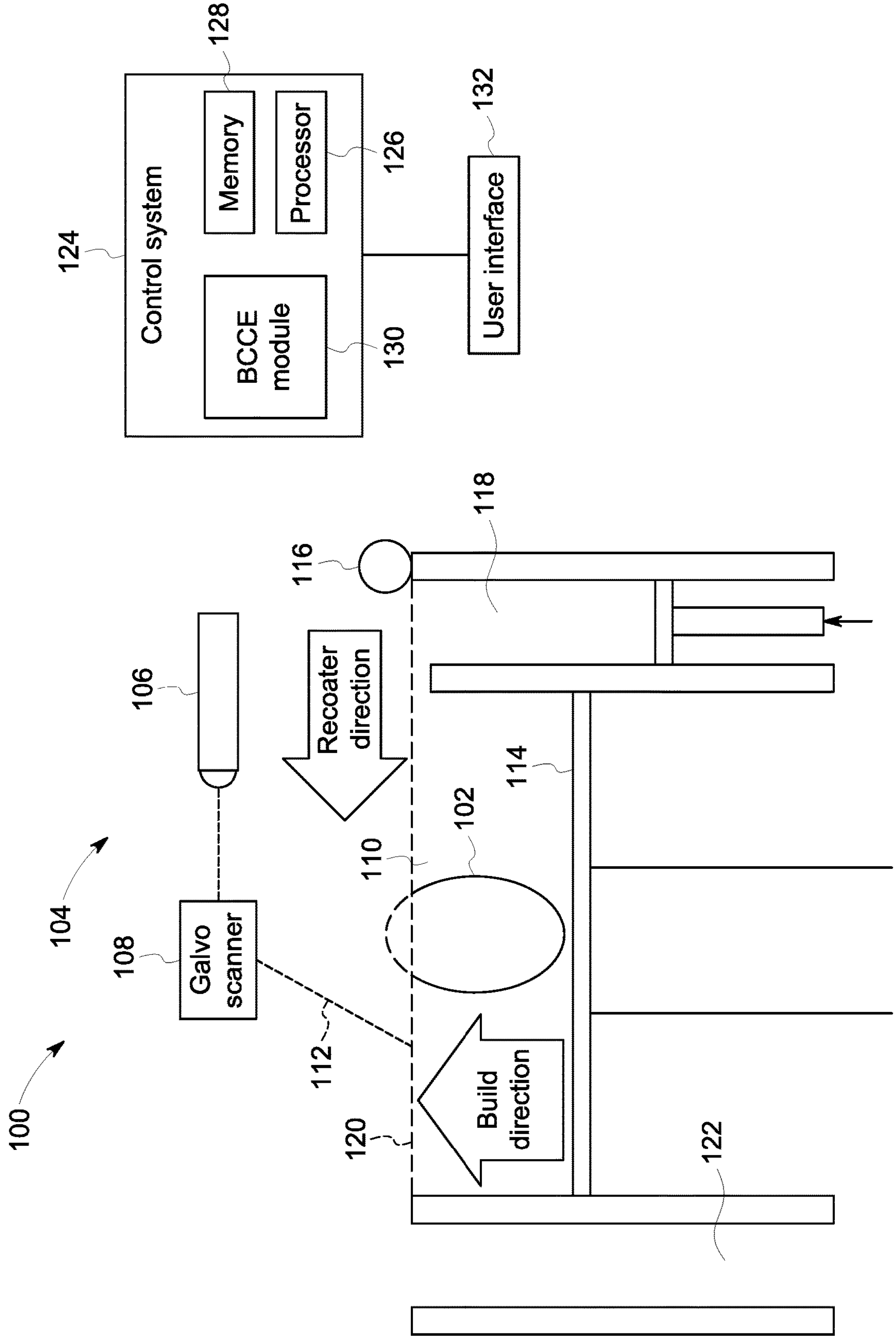
FIG. 1 is a schematic view of an exemplary additive manufacturing system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms “a”, “an”, and “the” include plural references unless the context clearly dictates otherwise.

“Optional” or “optionally” means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms “processor” and “computer” and related terms, e.g., “processing device” and “computing device”, are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term “non-transitory computer-readable media” is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term “non-transitory computer-readable media” includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term “real-time” refers to at least one of the time of occurrence of the associated events, the time of measurement and collection of predetermined data, the time to process the data, and the time of a system response to the events and the environment. In the embodiments described herein, these activities and events occur substantially instantaneously.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

As used herein, the term "build parameter" refers to any value relating to the fabrication of a component. For example, build parameters may include an operational setting of an additive manufacturing system and/or a design parameter of the component fabricated by the additive manufacturing system.

The systems and methods described herein include an additive manufacturing system including a build characteristic contribution evaluation module. The build characteristic contribution evaluation module is configured to generate a model of the component with a plurality of elements and at least one region of interest. For example, the elements may be three-dimensional elements such as voxels or tetrahedral elements that are arranged in an array to represent a three-dimensional object. The build characteristic contribution evaluation module is configured to determine build characteristic contribution profiles for the elements and identify one or more elements that contribute to the build characteristic of the region of interest. In some embodiments, the build characteristic contribution evaluation module is configured to sort the build characteristic contribution profiles for the plurality of elements and identify at least one element as a primary contributor and at least one element as a secondary contributor. The build characteristic contribution evaluation module is configured to output a build parameter for the component based on the build characteristic contribution profiles, and the additive manufacturing system fabricates the component in accordance with the build parameter. As a result, the additive manufacturing system is able to identify elements that will provide a desired change in the build characteristics of the region of interest and determine build parameters based on the identified elements to control the build characteristics of the additively manufactured component.

FIG. 1 is a schematic view of an exemplary additive manufacturing system 100. Additive manufacturing system 100 builds objects, for example, a part or component 102. In the exemplary embodiment, additive manufacturing system 100 includes a consolidation device 104 including a laser device 106 and a scanning device 108. Additive manufacturing system 100 is configured for fabricating component 102 using a layer-by-layer manufacturing process by sintering or melting a particulate 110 using an energy beam 112 generated by a source such as laser device 106. For example, in some embodiments, additive manufacturing system 100 is used for direct metal laser sintering (DMLS) or direct metal laser melting (DMLM). Laser device 106 provides a high-intensity heat source configured to generate a melt pool in a bed of particulate 110 using energy beam 112. Alternatively, consolidation device 104 may include any component that facilitates consolidation of a material using any of the processes and systems described herein.

In the exemplary embodiment, additive manufacturing system 100 further includes a build platform 114, a recoater arm 116, and a reservoir 118. During operation of additive manufacturing system 100, particulate 110 is supplied by reservoir 118 and spread evenly over build platform 114 using recoater arm 116. Recoater arm 116 is configured to maintain the particulate at a particulate level 120 and remove excess particulate material extending above particulate level 120 to a particulate container 122. Energy beam 112 consolidates particulate 110 to form a cross-sectional layer of component 102. After selective consolidation of the layer of particulate 110, build platform 114 is lowered and another layer of particulate 110 is spread over build platform 114 and component 102, followed by successive consolidation of the layer of particulate 110 by laser device 106. The process is repeated until component 102 is completely built up from the consolidated portion of particulate 110.

In the exemplary embodiment, additive manufacturing system 100 includes a control system 124. Control system 124 may include any suitable type of control system that enables system 100 to function as described herein. In the exemplary embodiment, control system 124 includes at least one processor 126 and at least one memory device 128. Processor 126 executes executable instructions to control the operation of additive manufacturing system 100 based at least partially on instructions from human operators. Control system 124 may include, for example, a 3D model of component 102 to be fabricated by additive manufacturing system 100. Executable instructions executed by control system 124 may include controlling the power output of laser device 106 and controlling a position and scan speed of scanning device 108. Control system 124 may include, for example, a calibration model of additive manufacturing system 100 and an electronic computer build file associated with a component, such as component 102. The calibration model may include, without limitation, an expected or desired melt pool size and temperature under a given set of operating conditions (e.g., a power of laser device 106) of system 100. The build file may include build parameters that are used to control one or more components of system 100. For example, build parameters may include, without limitation, a power of laser device 106, a scan speed of scanning device 108, a position and orientation of scanning device 108, a focus of scanning device 108, a scan spacing of scanning device 108, a scan direction of scanning device 108, a scan timing of scanning device 108, a pre-heat scan setting of scanning device 108, a post-heat scan setting of scanning device 108, a laser shot peening setting of consolidation device 104, a scanning strategy such as a scan order or a scan orientation for consolidation device 104, and/or a scan delay for consolidation device 104.

In addition, in the exemplary embodiment, control system 124 is configured to control one or more components of additive manufacturing system 100 based on build parameters associated with a build file stored, for example, in memory 128. In the exemplary embodiment, control system 124 is configured to control consolidation device 104 based on a build file associated with a component, such as component 102, to be fabricated with additive manufacturing system 100. More specifically, control system 124 is configured to control the position, movement, and scan speed of scanning device 108 based upon a predetermined path defined by a build file associated with component 102.

Control system 124 may also be configured to control other components of additive manufacturing system 100, including, without limitation, laser device 106. In one embodiment, for example, control system 124 controls the power output of laser device 106 based on build parameters associated with a build file.

In the exemplary embodiment, additive manufacturing system 100 is operated to fabricate component 102 from a computer modeled representation of the 3D geometry of component 102. The computer modeled representation may be produced in a computer aided design (CAD) or similar file. The CAD file of component 102 is converted into a layer-by-layer format that includes a plurality of build parameters for each layer of component 102. For example, a build layer of component 102 includes a particulate to be consolidated by additive manufacturing system 100. In the exemplary embodiment, component 102 is modeled in a desired orientation relative to the origin of the coordinate system used in additive manufacturing system 100. The geometry of component 102 is sliced into a stack of layers of a desired thickness, such that the geometry of each layer is an outline of the cross-section through component 102 at that particular layer location. Scan paths are generated across the geometry of a respective layer. The build parameters are applied along each scan path to fabricate that layer of component 102 from particulate 110 used to construct component 102. The steps are repeated for each respective layer of component 102 geometry. Once the process is completed, an electronic computer build file (or files) is generated, including all of the layers. The build file is loaded into control system 124 of additive manufacturing system 100 to control the system during fabrication of each layer.

After the build file is loaded into control system 124, additive manufacturing system 100 is operated to generate component 102 by implementing the layer-by-layer manufacturing process, such as a direct metal laser melting method. The exemplary layer-by-layer additive manufacturing process does not use a pre-existing article as the precursor to the final component, rather the process produces component 102 from a raw material in a configurable form, such as particulate 110. For example and without limitation, a steel component can be additively manufactured using a steel powder. Additive manufacturing system 100 enables fabrication of components, such as component 102, using a broad range of materials, for example and without limitation, metals, ceramics, glass, and polymers.

In the exemplary embodiment, control system 124 of additive manufacturing system 100 includes a build characteristic contribution evaluation (BCCE) module 130. BCCE module 130 is configured to generate a model of component 102 including a plurality of elements and a region of interest. In addition, BCCE module 130 is configured to apply a strain load to each element and generate a build characteristic contribution profile for each element based on the applied strain loads. The strain load may include a directional strain load, a strain tensor load, and/or any other load. In some embodiments, the BCCE module 130 is configured to apply different directional strain loads to each element. For example, the strain loads may be applied to each element in at least three different directions and a linear analysis may be used to determine the effect of a directional strain load in any direction. The directional strain loads may have same or different magnitudes. In some embodiments, the characteristic contribution map is generated using strain loads of different magnitudes applied to the elements.

In some embodiments, BCCE module 130 determines the build contribution profile for each element by running a first simulation with the strain load applied to the element and a second simulation without the strain load applied to the element. BCCE module 130 monitors the difference of one or more build characteristics of the region of interest during the first and second simulations. The build contribution profile is the difference between the build characteristic of the first simulation and the build characteristic of the second simulation.

In further embodiments, BCCE module 130 adds elements to a model in a layer-by-layer format. When each layer is added, BCCE module 130 applies a strain load to each element (or a set of elements) and determines the build characteristic of the region of interest when the strain load is applied to the element (or set of elements). BCCE module 130 compares the build characteristic related to the loaded element (or set of elements) to a build characteristic of the region of interest when the layer is in a base state. The base state of a layer may include loads applied to all elements, loads applied to some elements, or no loads applied to any elements. The build contribution profile is the difference between the build characteristic when the strain load is applied to the element and the build characteristic when the layer is in the base state. In alternative embodiments, BCCE module 130 may determine any build contribution profiles that enable additive manufacturing system 100 to operate as described herein.

Moreover, BCCE module 130 is configured to combine the build characteristic contribution profile for the elements to generate a build characteristic contribution map. The build characteristic contribution map includes the build characteristic contribution profiles for the elements and relates the locations of the elements to the location of the at least one region of interest in the component 102.

In some embodiments, BCCE module 130 is configured to provide information for two-dimensional or three-dimensional scan processes. For example, BCCE module 130 utilizes strain loads in a two-dimensional plane to determine stress tenors (e.g., a vector having a unit length and a direction perpendicular to the surface of the element) for elements (or sets of elements). Using the determined stress tenors, BCCE module 130 is able to determine build parameters that provide desired build characteristics of component 102 for two-dimensional or three-dimensional scan strategies.

BCCE module 130 enables additive manufacturing system 100 to evaluate component 102 and improve build characteristics of component 102 by determining areas of component 102 that have the greatest effect on the build characteristics of the region of interest. As a result, control system 124 is able to adjust a build parameter of component 102 at the locations of contributory elements based on the build characteristic contribution profiles and, thereby, control the build characteristic in the region of interest. For example, in some embodiments, control system 124 adjusts an operating setting of consolidation device 104 such as a power setting of laser device 106, a speed of scanning device 108, a focus of scanning device 108, a scan spacing of scanning device 108, a scan direction of scanning device 108, a scan timing of scanning device 108, a pre-heat scan setting of scanning device 108, a post-heat scan setting of scanning device 108, a laser shot peening setting of consolidation device 104, a scanning strategy such as a scan order or a scan orientation for consolidation device 104, and/or a scan delay for consolidation device 104. In further embodiments, control system 124 adjusts a design parameter such as the type of material used for an area of component 102, the amount of material used for component 102, and/or the shape of component 102. Suitably, the design of component 102 is adjusted at the location of the identified contributory elements and not necessarily in the region of interest. The adjusted build parameter may be stored in the build file of the component 102 and/or control system 124 may store the build parameters separate from the build file and retrieve the adjusted parameters during operation of additive manufacturing system 100. In alternative embodiments, control system 124 adjusts any build parameter that enables additive manufacturing system 100 to operate as described herein.

In some embodiments, additive manufacturing system 100 fabricates component 102 in a layer-by-layer process. Accordingly, the build characteristic contribution profiles of elements may be determined for each layer of component 102. For example, in some embodiments, BCCE module 130 determines the build characteristic contribution profiles of elements for a layer of the component and then BCCE module 130 applies an inherent strain to the plurality of elements in the layer. BCCE module 130 is able to compare the build characteristic at region of interest with and without cooling strain and determine the contribution of each element to the build characteristic for each layer. Moreover, BCCE module 130 may determine separate build parameters for each layer based on the build characteristic contribution profiles of the layers. Additive manufacturing system 100 operates in accordance with the determined build parameters, which may be the same or different for each layer of the multi-layer build.

In addition, in the exemplary embodiment, additive manufacturing system 100 includes a user interface 132. User interface 132 enables a user to interact with additive manufacturing system 100. For example, user interface 132 may include, an output device such as a display and/or an input device. In some embodiments, the display and input device are combined in a single device such as a touchscreen. User interface 132 may enable a user to identify regions of interest in a model, input information relating to build parameters, select models for BCCE module 130 to evaluate, and/or input or receive any other information that enables additive manufacturing system 100 to operate as described herein.

Figure 2:
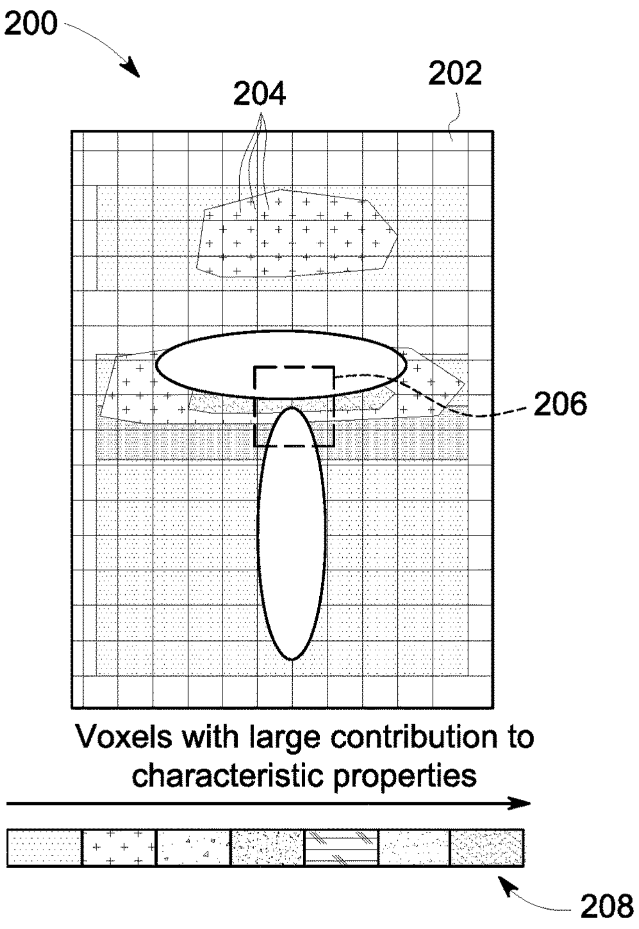
FIG. 2 is a schematic view of a model of a component fabricated using the additive manufacturing system shown in FIG. 1, the model having a build characteristic contribution map with a graduated scale.

FIG. 2 is a schematic view of a model 200 of a component 202 fabricated using additive manufacturing system 100 (shown in FIG. 1). In the exemplary embodiment, BCCE module 130 (shown in FIG. 1) is configured to generate a model such as model 200 of component 202. Model 200 includes a plurality of elements 204 and a region of interest 206. In the exemplary embodiment, elements 204 are three-dimensional voxels that constitute the volume of model 200. In the exemplary embodiment, each element 204 is a cube. Elements 204 are arranged in a plurality of layers. Model 200 includes any number of elements that provide the volume and shape of model 200. In alternative embodiments, model 200 includes any elements 204 that enable model 200 to function as described herein.

Model 200 has a build characteristic contribution map with a graduated scale 208. The build characteristic contribution map indicates the effect of elements 204 on a build characteristic of region of interest 206 of component 202. Graduated scale 208 is a measure of the relative values of elements' 204 contribution to the build characteristic from a low value to a high value. Accordingly, model 200 and the build characteristic contribution map enable control system 124 (shown in FIG. 1) and/or a user to sort elements 204 according to contributions to the build characteristic of region of interest 206 and to identify elements 204 which have the largest effect on the build characteristic. As a result, control system 124 is able to adjust the build parameters of component 202 based on individual elements 204 and provide increased control of the build characteristic of region of interest 206.

Figure 3:
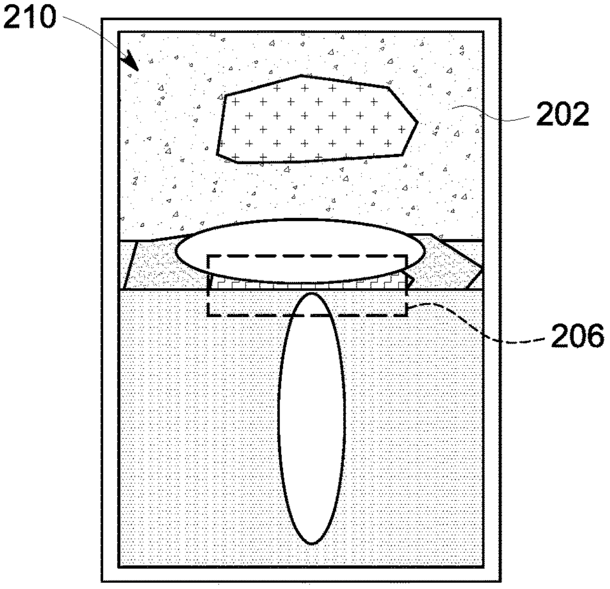
FIG. 3 is a schematic view of a model of the component shown in FIG. 2, the model having an initial build characteristic profile indicating a region of interest having an initial build characteristic.

FIG. 3 is a schematic view of a model 210 of component 202. Model 210 has a build characteristic profile and a region of interest 206. For example, region of interest 206 may be a location of a potential or predicted crack, defect, or other anomaly in component 202. Region of interest 206 may have a build characteristic such as an elevated stress and/or a displacement or distortion. Region of interest 206 may be identified by a user, using user interface 132 (shown in FIG. 1), and/or identified at least in part by control system 124 (shown in FIG. 1). For example, in some embodiments, control system 124 receives an input from user interface 132 indicating one or more regions of interest 206 in component 202 and control system 124 stores region of interest 206 in memory 128 (shown in FIG. 1). In further embodiments, control system 124 identifies one or more regions of interest 206 by recognizing areas of the build characteristic profile that have a build characteristic value that meets a threshold value. In alternative embodiments, control system 124 identifies region of interest 206 in any manner that enables additive manufacturing system 100 (shown in FIG. 1) to operate as described herein.

Also, in the exemplary embodiment, the build characteristic profile is a stress profile of component 202 and region of interest 206 is an area having a stress which is greater than a threshold value. In alternative embodiments, model 210 has any build characteristic profile that enables model 210 to function as described herein.

Figure 4:
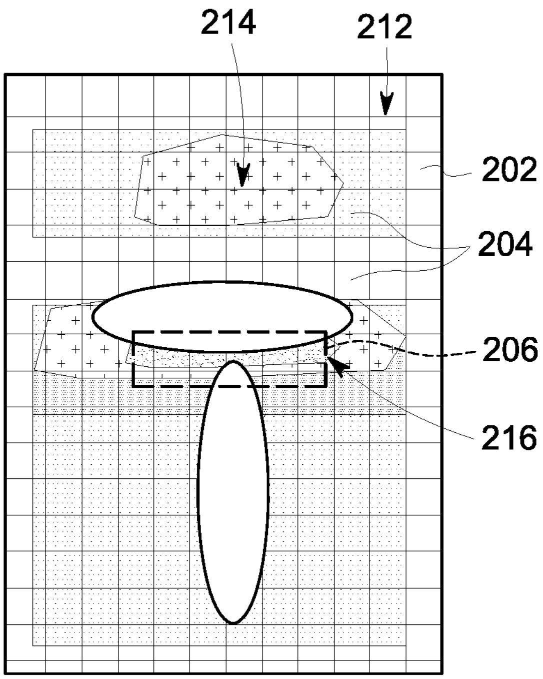
FIG. 4 is a schematic view of a model of the component shown in FIG. 2, the model having a build characteristic contribution map including build characteristic contribution profiles for a plurality of elements of the model.

FIG. 4 is a schematic view of a model 212 of component 202. Model 212 has a build characteristic contribution map including build characteristic contribution profiles for a plurality of elements 204 of model 212. The build characteristic contribution map illustrates the locations of the build characteristic contribution profiles of elements 204 relative to region of interest 206. Build characteristic contribution profiles indicate the effect of elements 204 on the build characteristic of region of interest 206. In the exemplary embodiment, build characteristic contribution profiles indicate the effect of a directional strain load applied individually to each element 204 on stress in region of interest 206. In alternative embodiments, build characteristic contribution map includes any build characteristic contribution profiles that enable model 212 to function as described herein. For example, in some embodiments, the build characteristic contribution profiles relate the strain on elements 204 to a displacement or distortion in region of interest 206.

In the exemplary embodiment, the build characteristic contribution map indicates some elements 204 have a significant effect on the build characteristic of region of interest 206. In particular, model 212 includes a first set of elements 214 and a second set of elements 216. Elements 214, 216 each have a greater effect on the build characteristic of region of interest 206 than other elements 204. The build characteristic of region of interest 206 may be adjusted by altering build parameters of component 202 based on elements 214, 216. As a result, the build characteristic contribution map enables the build parameters of component 202 to be controlled more efficiently and with a greater effect than systems that alter build parameters based on the profile of the entire component.

Figure 5:
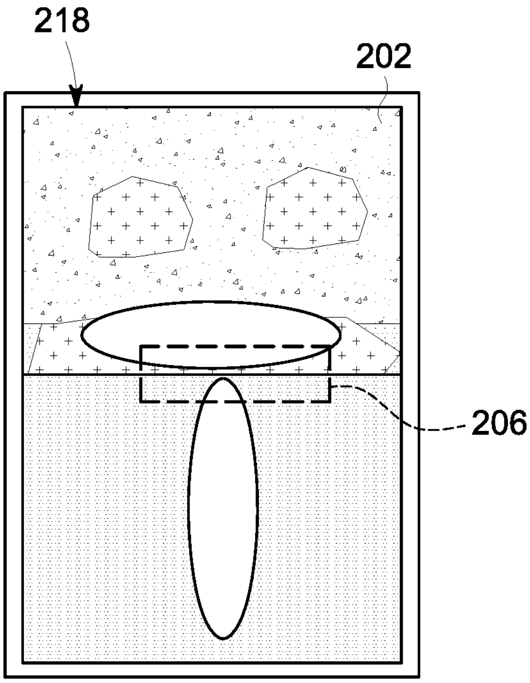
FIG. 5 is a schematic view of a model of the component shown in FIG. 2, the model having a build characteristic profile indicating a region of interest having an altered build characteristic in comparison to the build characteristic of the region of interest of the model shown in FIG. 3.

FIG. 5 is a schematic view of a model 218 of component 202. Model 218 has a build characteristic profile and region of interest 206. Region of interest 206 in model 218 has an altered build characteristic in comparison to the build characteristic of region of interest 206 in model 210 (shown in FIG. 3). The build characteristic of region of interest 206 has been altered by adjusting a build parameter of component 202 based on the build characteristic contribution map shown in FIG. 4. In the exemplary embodiment, the build characteristic is a stress and region of interest 206 in model 218 has a reduced stress in comparison to region of interest 206 in model 210 (shown in FIG. 3).

Figure 6:
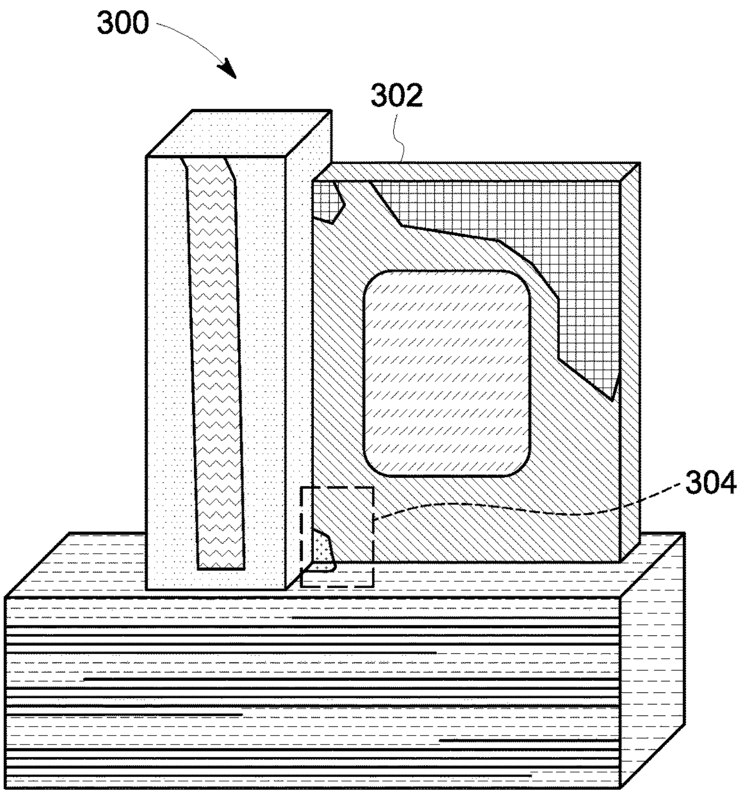
FIG. 6 is a perspective view of a model of another component fabricated using the additive manufacturing system shown in FIG. 1, the model including a build characteristic profile and indicating a region of interest.

FIG. 6 is a perspective view of a model 300 of another component 302 fabricated using additive manufacturing system 100 (shown in FIG. 1). Model 300 has a build characteristic profile and a region of interest 304. The build characteristic of component 302 in region of interest 304 is outside of a threshold range. For example, region of interest 304 may have a high stress value relative to the surrounding areas and/or region of interest 304 may include a displacement or distortion.

Figure 7:
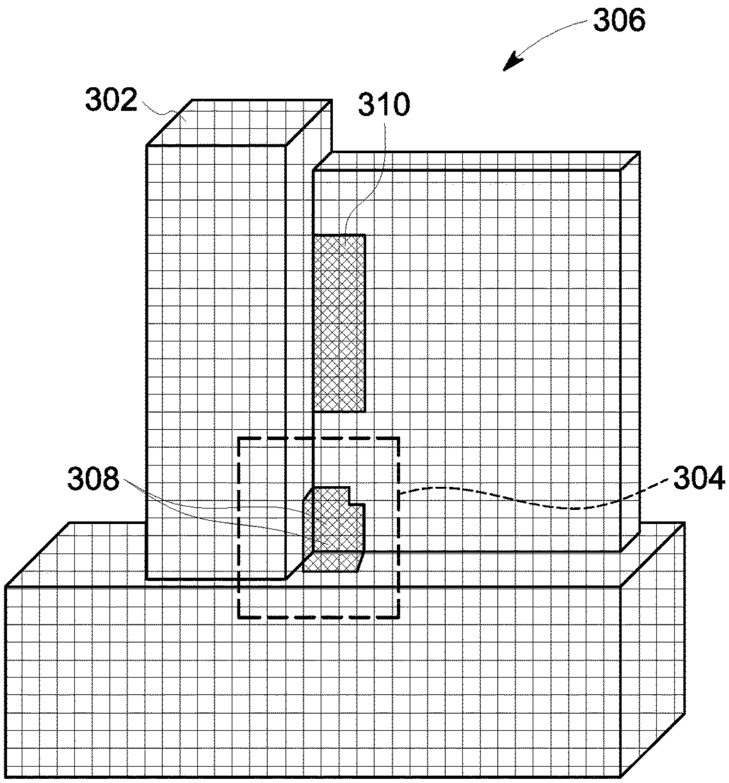
FIG. 7 is a perspective view of a model of the component shown in FIG. 6, the model having a build characteristic contribution map indicating at least one first contributory element and at least one second contributory element for the region of interest.

FIG. 7 is a perspective view of a model 306 of component 302. Model 306 has a build characteristic contribution map indicating at least one first contributory element 308 and at least one second contributory element 310. First contributory elements 308 and second contributory elements 310 each have an effect on the build characteristic of region of interest 304. First contributory elements 308 are spaced apart from second contributory elements 310. Build parameters that are determined based on first contributory elements and second contributory elements 310 are adjusted separately to affect the build characteristic of region of interest 304. Accordingly, one or more build parameters of component 302 may be adjusted in a plurality of stages based on first contributory elements 308 and second contributory elements 310 to provide a multi-stage adjustment to the build characteristic. In the exemplary embodiment, first contributory elements 308 are within region of interest 304. Second contributory elements 310 are outside of region of interest 304. In alternative embodiments, model 306 has any contributory elements 308, 310 that enable model 306 to function as described herein.

Figure 8:
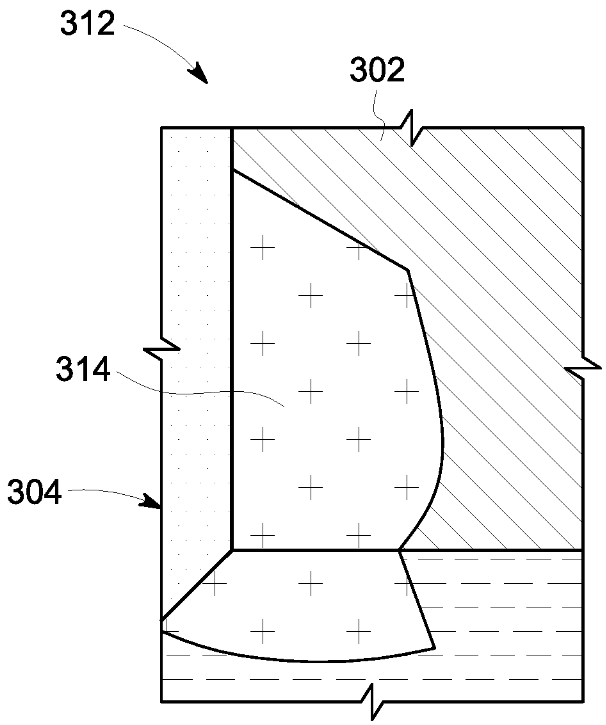
FIG. 8 is an enlarged view of a region of interest of a model of the component shown in FIG. 6, the model including a build characteristic profile illustrating the region of interest having a first build characteristic.

FIG. 8 is an enlarged view of region of interest 304 of a model 312 of component 302. Model 312 includes a build characteristic profile illustrating region of interest 304 having a first build characteristic 314. For example, first build characteristic 314 may be outside of a desired range of values. Accordingly, first build characteristic 314 of region of interest 304 may need to be changed to enable component 302 to meet desired performance criteria. First build characteristic 314 may be changed by adjusting one or more build parameters based on first contributory elements 308 and second contributory elements 310.

Figure 9:
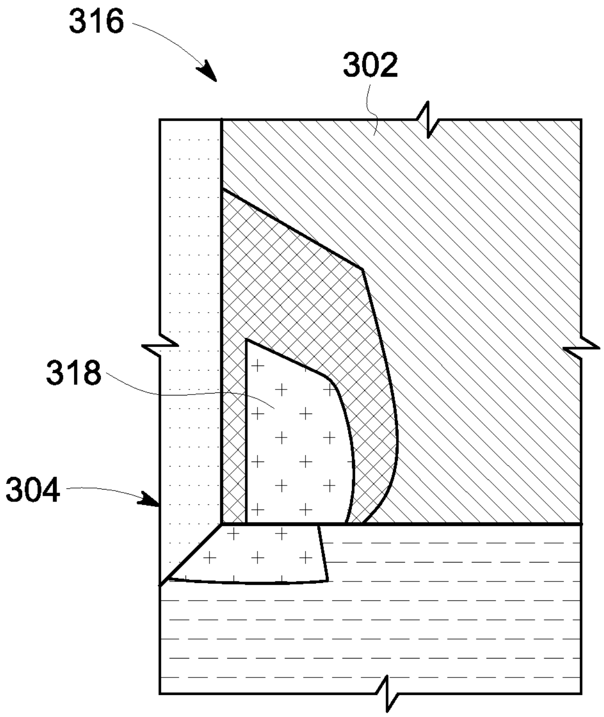
FIG. 9 is an enlarged view of a region of interest of a model of the component shown in FIG. 6, the model including a build characteristic profile illustrating the region of interest having a second build characteristic after an adjustment to a first build parameter based on the first contributory elements shown in FIG. 7.

FIG. 9 is an enlarged view of region of interest 304 of a model 316 of component 302. Model 316 includes a build characteristic profile illustrating region of interest 304 having a second build characteristic 318 after an adjustment to a first build parameter based on first contributory elements 308. Second build characteristic 318 is different than first build characteristic 314. Accordingly, adjusting the first build parameter based on first contributory elements 308 changes the build characteristic of region of interest 304.

Figure 10:
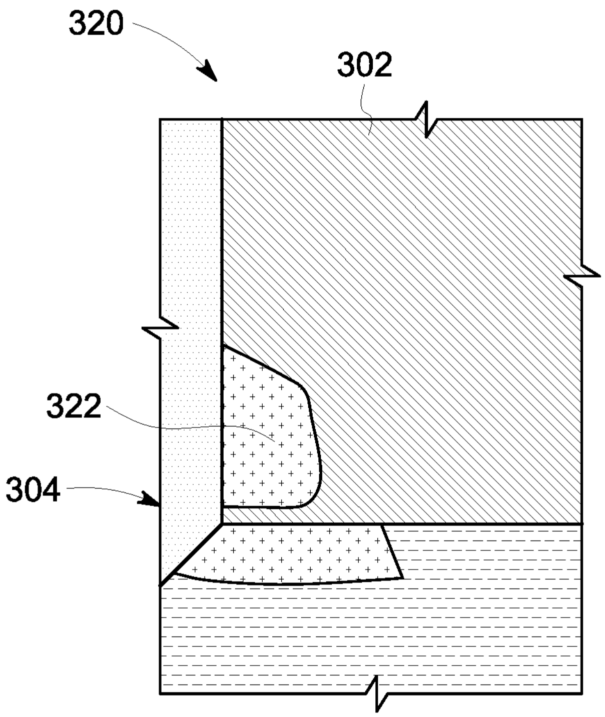
FIG. 10 is an enlarged view of a region of interest of a model of the component shown in FIG. 6, the model including a build characteristic profile illustrating the region of interest having a third build characteristic after an adjustment to a second build parameter based on the second contributory elements shown in FIG. 7.

FIG. 10 is an enlarged view of region of interest 304 of a model 320 of component 302. Model 316 includes a build characteristic profile illustrating region of interest 304 having a third build characteristic 322 after an adjustment to a second build parameter based on second contributory elements 310. Third build characteristic 322 is different than first build characteristic 314 and second build characteristic 318. Accordingly, adjusting the second build parameter based on second contributory elements 310 enables the build characteristic of region of interest 304 to be further adjusted. Accordingly, the characteristics of region of interest 304 may be controlled to be within a desired range of values by adjusting the first and second build parameters.

Figure 11:
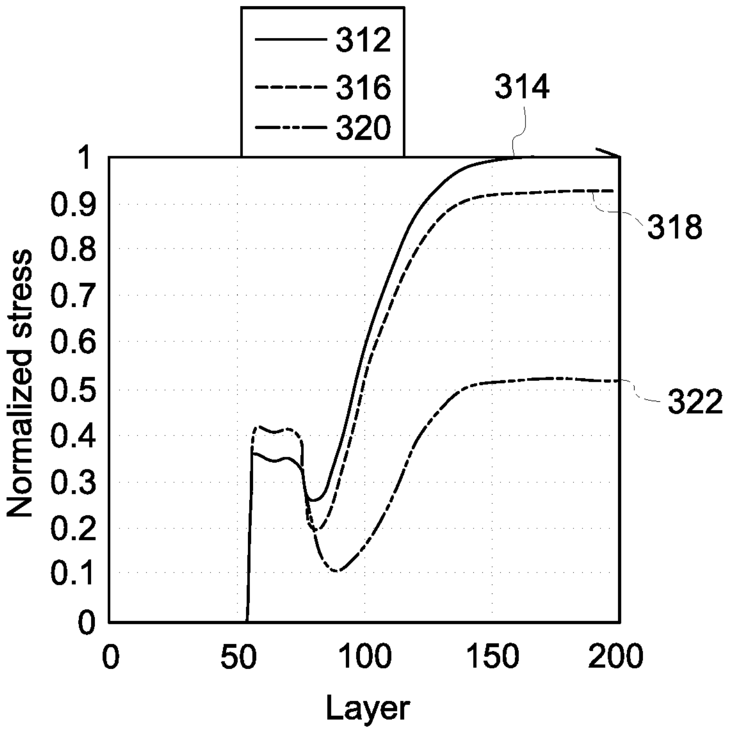
FIG. 11 is a graphical representation of the build characteristics of the region of interest of the models shown in FIGS. 8-10.

FIG. 11 is a graphical representation of build characteristic 314, 318, 322 of region of interest 304 at different adjustment stages. In the exemplary embodiment, FIG. 11 includes a graph illustrating a build characteristic, e.g., normalized stress, of region of interest 304 in different layers of the additively manufactured component. FIG. 11 includes a first curve representing model 312, a second curve representing model 316, and a third curve representing model 320. As shown in FIGS. 8-11, the build characteristic of region of interest 304 is changed in models 312, 316, 320 by adjusting the fabrication of the component using the first and second build parameters. In the exemplary embodiment, the first build parameter is determined based on the effect of first contributory elements 308 on the build characteristic of region of interest 304 and the second build parameter is determined based on the effect of second contributory elements 310 on the build characteristic of region of interest 304.

In the exemplary embodiment, region of interest 304 with first build characteristic 314 has an increased stress in comparison to other regions of component 302. After the adjustment of the first building parameter based on first contributory elements 308, region of interest 304 has second build characteristic 318 which is different than first build characteristic 314, e.g., second build characteristic 318 represents a reduced stress in comparison to first build characteristic 314. Moreover, after the adjustment of the second building parameter based on second contributory elements 310, region of interest 304 has third build characteristic 322 which is different than first build characteristic 314 and second build characteristic 318, e.g., third build characteristic 322 represents a further reduced stress in comparison to first build characteristic 314 and second build characteristic 318. Accordingly, the build characteristic contribution map enables control of the build characteristics of a region of interest by highlighting elements with the greatest effect on the build characteristic and enabling adjustments to build parameters of portions of component 302 that will provide a desired adjustment to the build characteristic. Moreover, the build characteristic contribution map allows for adjustments to individual elements or groups of elements that are not necessarily within the region of interest.

Figure 12:
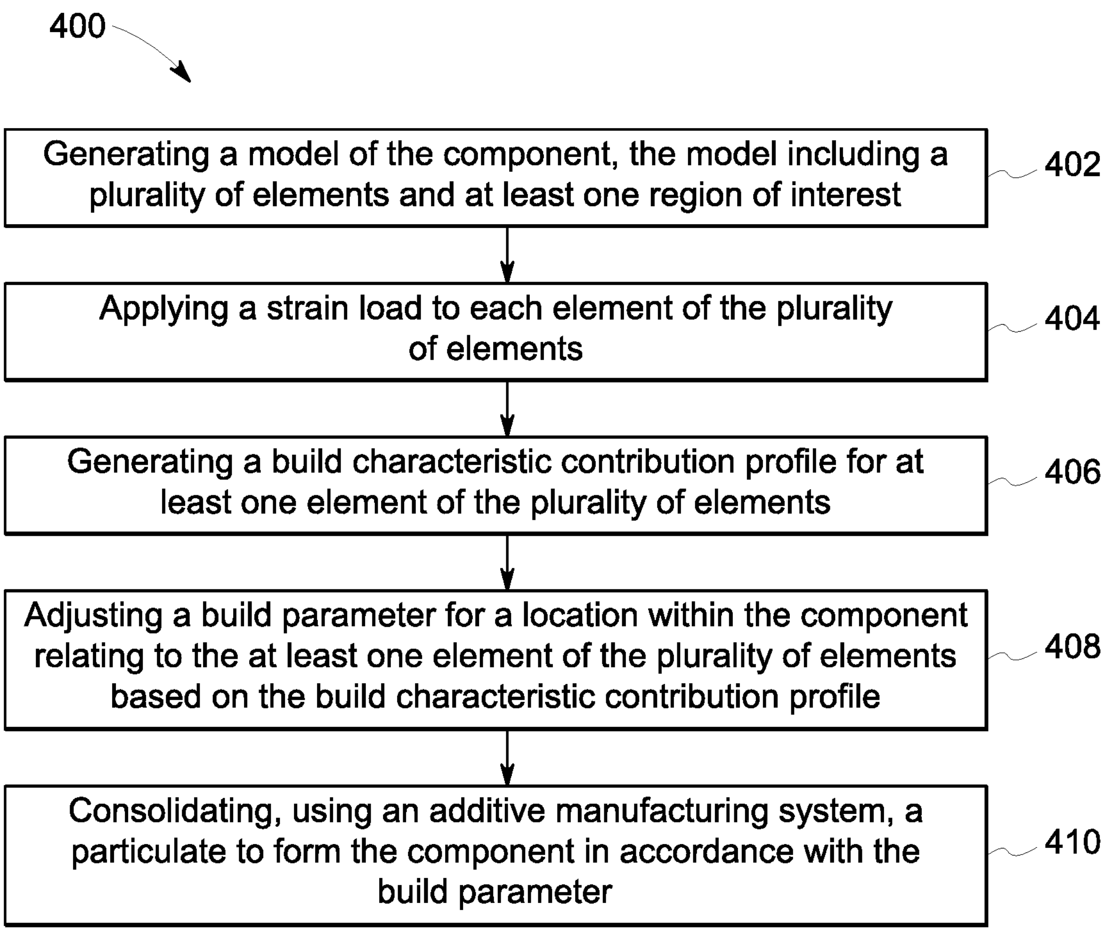
FIG. 12 is a flow chart of an exemplary method of fabricating a component using the additive manufacturing system shown in FIG. 1.

FIG. 12 is a flow chart of an exemplary method 400 of fabricating a component (e.g., component 102 shown in FIG. 1, component 202 shown in FIG. 2, or component 302 shown in FIG. 6) using additive manufacturing system 100. In reference to FIGS. 1-5 and 12, method 400 generally includes generating 402 a model of the component. The model includes a plurality of elements 204 and region of interest 206. Also, method 400 includes applying 404 a strain load to at least one element 204 of the plurality of elements 204 and generating 406 a build characteristic contribution profile for the at least one element 204 of the plurality of elements. In some embodiments, control system 124 applies a strain load to each element 204 (or each set of elements 204) and determines a build characteristic contribution profile for each element 204 (or set of elements 204). Each build characteristic contribution profile includes an effect of the directional strain load applied to the at least one element 204 on a build characteristic of at least one location within the at least one region of interest 206. In some embodiments, method 400 includes combining the build characteristic contribution profiles of elements 204 and generating a build characteristic contribution map. In further embodiments, method 400 includes comparing the build characteristic contribution profiles and sorting elements 204 according to the build characteristic contribution profiles.

In addition, method 400 includes adjusting 408 a build parameter for a location within the component relating to at least one element 204 based on the build characteristic contribution profile. For example, in some embodiments, control system 124 adjusts at least one of a design parameter of the component and an operating setting of additive manufacturing system 100 based on the build characteristic contribution profiles. Moreover, in some embodiments, control system 124 identifies elements 204 having the greatest effect on build characteristic of region of interest 206 based on build characteristic contribution profiles and adjusts the build parameter using the build characteristic contribution profiles of the identified elements to provide a desired build characteristic of region of interest 206.

Moreover, method 400 includes consolidating 410, using additive manufacturing system 100, particulate 110 to form the component. For example, in some embodiments, additive manufacturing system 100 deposits particulate 110 on build platform 114 and consolidation device 104 consolidates particulate 110 to form component 102. In alternative embodiments, the component is fabricated in any manner that enables additive manufacturing system 100 to operate as described herein.

To form the component, additive manufacturing system 100 operates in accordance with the adjusted build parameter. For example, in some embodiments, additive manufacturing system 100 fabricates a component based on an adjusted design parameter which has been determined based on the build characteristic contribution profile to fabricate a component which is designed to provide a desired build characteristic of region of interest 206. In further embodiments, additive manufacturing system 100 operates according to an operational setting, such as an operational setting of consolidation device 104, which has been determined based on the build characteristic contribution profile.

The embodiments described herein include an additive manufacturing system including a build characteristic contribution evaluation module. The build characteristic contribution evaluation module is configured to generate a model of the component with a plurality of elements and at least one region of interest. Elements are three-dimensional elements that are arranged in an array to represent a three-dimensional object. The build characteristic contribution evaluation module is configured to determine build characteristic contribution profiles for the elements and identify one or more elements that contribute to the build characteristic of the region of interest. In some embodiments, the build characteristic contribution evaluation module is configured to sort the build characteristic contribution profiles for the plurality of elements and identify at least one element as a primary contributor and at least one element as a secondary contributor. The build characteristic contribution evaluation module is configured output a build parameter for the component based on the build characteristic contribution profiles, and the additive manufacturing system fabricates the component in accordance with the build parameter. As a result, the additive manufacturing system is able to identify elements that will provide a desired change in the build characteristics of the region of interest and determine build parameters based on the identified elements to control the build characteristics of the additively manufactured component.

An exemplary technical effect of the methods, systems, and apparatus described herein includes at least one of: a) reducing anomalies in components fabricated using an additive manufacturing process by enabling the identification and control of contributory regions for the anomalies, b) providing real-time feedback and control of build characteristic of components fabricated using an additive manufacturing system, c) enabling the fabrication of components with complicated geometries by providing improved control of build characteristics of the component, d) reducing the cost of additively manufacturing a component, and e) enabling more precise and reliable adjustment of a build characteristic of component by providing a simulation which identifies regions that contribute to the build characteristic.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:

memory and;

a control system communicatively coupled to a consolidation device and including a processor configured to control operation of the consolidation device, the consolidation device including a laser device and a scanning device, the control system configured to:

load a computer file from the memory for processing by the control system, the computer file including a build file enabling the control system to control operation of the consolidation device during each layer of building a component;

generate a model of the component using the computer file, the model including a plurality of elements and at least one region of interest, the at least one region of interest having a build characteristic including at least one of stress, displacement, or distortion, the at least one region of interest determined by analyzing a build characteristic value of a build characteristic profile with respect to a threshold value, the plurality of elements to provide volume and shape of the component in the model and including at least a first element and a second element, the first element and the second element being three-dimensional voxels and arranged to represent the component for building;

run a first simulation using the model modified with a modeled strain load applied element-by-element to at least the first element and the second element of the plurality of elements to produce a first build characteristic output, the modeled strain load including a plurality of different directional strain loads applied to the first element and applied to the second element;

run a second simulation using the model without the modeled strain load applied element-by-element to at least the first element and the second element to produce a second build characteristic output;

generate a first build characteristic contribution profile for the first element and generate a second build characteristic contribution profile for the second element of the plurality of elements, the first and second build characteristic contribution profiles representing an effect of the modeled strain load applied to the first element and the second element, respectively, on the build characteristic of at least one location within the at least one region of interest, the effect determined by a difference between the first simulation and the second simulation using the first build characteristic output and the second build characteristic output;

compare the first build characteristic contribution profile and the second build characteristic contribution profile with respect to the at least one location within the at least one region of interest in the component; and adjust a build parameter for the at least one location within the component relating to the first element of the plurality of elements based on the comparison of the first build characteristic contribution profile and the second build characteristic contribution profile determining that the first element is a primary contributor to the build characteristic and the second element is a secondary contributor to the build characteristic according to a graduated scale, the build parameter provided from the control system to the consolidation device to adjust operation of the consolidation device to build the component with improvement to the build characteristic in the least one region of interest, the control system to control operation of the consolidation device according to the build parameter to build the component, the control system to control operation of the consolidation device by adjusting an operating setting of the consolidation device, the operating setting including at least one of a power output of the laser device, a position of the scanning device, or a scan speed of the scanning device based on the adjusting of the build parameter, wherein at least a portion of the adjustment is stored and retrieved during the build.

2. The additive manufacturing system in accordance with claim 1, wherein the control system is configured to identify the at least one region of interest in the model, the at least one region of interest relating to at least one of a high stress location and a deformation location.

3. The additive manufacturing system in accordance with claim 2 further comprising a user interface communicatively coupled to said control system and configured to receive a user input, wherein said control system is configured to identify the at least one region of interest in the model based in part on the user input.

4. The additive manufacturing system in accordance with claim 1, wherein said control system is further configured to generate a plurality of the build characteristic contribution profiles for the plurality of elements and combine the build characteristic contribution profiles to generate a build characteristic contribution map of the component.

5. The additive manufacturing system in accordance with claim 4, wherein said control system is further configured to compare the build characteristic contribution profiles of the plurality of elements and sort the plurality of elements based on the comparison of the build characteristic contribution profiles.

6. The additive manufacturing system in accordance with claim 4, wherein said control system is further configured to identify the first element of the plurality of elements as a first contributory element based on the first build characteristic contribution profile, and wherein said control system is configured to adjust the build parameter of the component based on the first build characteristic contribution profile of the first contributory element.

7. The additive manufacturing system in accordance with claim 6, wherein the first contributory element is located outside of the at least one region of interest in the model.

8. The additive manufacturing system in accordance with claim 6, wherein said control system is further configured to identify the second element of the plurality of elements as a second contributory element based on the second build characteristic contribution profile, and wherein said control system is configured to adjust the build parameter of the component based on the second build characteristic contribution profile of the second contributory element.

9. The additive manufacturing system in accordance with claim 1, wherein the plurality of elements are arranged in a plurality of layers, and wherein said control system is configured to determine build characteristic contribution profiles for the plurality of elements in each layer and apply a modeled inherent strain to the plurality of elements in each layer after determining the build characteristic contribution profile for the plurality of elements in the respective layer.

10. The additive manufacturing system in accordance with claim 1 further comprising a build platform configured to receive a particulate and a consolidation device configured to consolidate the particulate to form a component, wherein the build parameter relates to an operating setting of said consolidation device.

11. A method of fabricating a component, the method comprising:

loading a computer file from storage for processing by a processor, the computer file including a build file enabling control of operation of a consolidation device during each layer of fabricating the component;

generating, by executing an instruction using the processor and the computer file, a model of the component, the model including a plurality of elements and at least one region of interest, the at least one region of interest having a build characteristic including at least one of stress, displacement, or distortion, the at least one region of interest determined by analyzing a build characteristic value of a build characteristic profile with respect to a threshold value, the plurality of elements to provide volume and shape of the component in the model and including at least a first element and a second element, the first element and the second element being three-dimensional voxels and arranged to represent the component for building;

running, by executing an instruction using the processor, a first simulation using the model modified with a modeled strain load applied element-by-element to at least the first element and the second element of the plurality of elements to produce a first build characteristic output, the modeled strain load including a plurality of different directional strain loads applied to the first element and applied to the second element;

running, by executing an instruction using the processor, a second simulation using the model without the modeled strain load applied to element-by-element at least the first element and the second element to produce a second build characteristic output;

generating, by executing an instruction using the processor, a first build characteristic contribution profile for the first element and generate a second build characteristic contribution profile for the second element of the plurality of elements, the first and second build characteristic contribution profiles representing an effect of the modeled strain load applied to the first element and the second element, respectively, on the build characteristic of at least one location within the at least one region of interest, the effect determined by a difference between the first simulation and the second simulation using the first build characteristic output and the second build characteristic output;

comparing, by executing an instruction using the processor, the first build characteristic contribution profile and the second build characteristic contribution profile with respect to the at least one location within the at least one region of interest in the component; and adjusting, by executing an instruction using the processor, a build parameter for the at least one location within the component relating to the first element of the plurality of elements based on the comparison of the first build characteristic contribution profile and the second build characteristic contribution profile determining that the first element is a primary contributor to the build characteristic and the second element is a secondary contributor to the build characteristic, the build parameter provided to a consolidation device to control operation of the consolidation device according to the build parameter to adjust operation of the consolidation device to build the component with improvement to the build characteristic in the least one region of interest, the consolidation device including a laser device and a scanning device, the processor to control operation of the consolidation device by adjusting an operating setting of the consolidation device, the operating setting including at least one of a power output of the laser device, a position of the scanning device, or a scan speed of the scanning device based on the adjusting of the build parameter.

12. The method in accordance with claim 11 further comprising consolidating, using an additive manufacturing system, a particulate to form the component in accordance with the build parameter, wherein adjusting a build parameter of the component comprises adjusting at least one of a design parameter of the component and an operating setting of a consolidation device of the additive manufacturing system.

13. The method in accordance with claim 11 further comprising identifying the at least one region of interest in the model based on at least in part on a user input, the at least one region of interest relating to at least one of a high stress location and a deformation location.

14. The method in accordance with claim 11, wherein generating a first build characteristic contribution profile for the first element and generate a second build characteristic contribution profile for the second element of the plurality of elements comprises generating a plurality of the build characteristic contribution profiles for the plurality of elements, the method further comprising combining the build characteristic contribution profiles to generate a build characteristic contribution map of the component.

15. The method in accordance with claim 14 further comprising:

comparing the build characteristic contribution profiles of the plurality of elements to each other; and sorting the plurality of elements based on the comparison of the build characteristic contribution profiles.

16. The method in accordance with claim 14 further comprising identifying the first element of the plurality of elements as a first contributory element based on the first build characteristic contribution profile, wherein adjusting the build parameter of the component comprises adjusting at least one of a first design parameter of the component and a first operating setting of an additive manufacturing system based on the first build characteristic contribution profile of the first contributory element.

17. The method in accordance with claim 16 further comprising:

identifying the second element of the plurality of elements as a second contributory element based on the second build characteristic contribution profile; and adjusting at least one of a second design parameter of the component and a second operating setting of the additive manufacturing system based on the second build characteristic contribution profile of the second contributory element.

18. The method in accordance with claim 11, wherein the model includes a plurality of layers including the plurality of elements, the method further comprising:

determining build characteristic contribution profiles for the plurality of elements in each layer; and applying an inherent strain to the plurality of elements in each layer after determining the build characteristic contribution profile for the plurality of elements in the respective layer.

19. A build characteristic contribution evaluation module for an additive manufacturing system, the build characteristic contribution evaluation module comprising at least one processor in communication with at least one memory device, said at least one processor programmed to:

load a computer file from the at least one memory device for processing by the at least one processor, the computer file including a build file enabling control of operation of a consolidation device of the additive manufacturing system during each layer of building a component;

generate a model of the component, the model including a plurality of elements and at least one region of interest, the at least one region of interest having a build characteristic including at least one of stress, displacement, or distortion, the at least one region of interest determined by analyzing a build characteristic value of a build characteristic profile with respect to a threshold value, the plurality of elements to provide volume and shape of the component in the model and including at least a first element and a second element, the first element and the second element being three-dimensional and arranged to represent the component for building;

run a first simulation using the model modified with a modeled strain load applied element-by-element to at least the first element and the second element of the plurality of elements to produce a first build characteristic output, the modeled strain load including a plurality of different directional strain loads applied to the first element and applied to the second element;

run a second simulation using the model without the modeled strain load applied element-by-element to at least the first element and the second element to produce a second build characteristic output;

generate a first build characteristic contribution profile for the first element and generate a second build characteristic contribution profile for the second element of the plurality of elements, the first and second build characteristic contribution profiles representing an effect of the modeled strain load applied to the first element and the second element, respectively, on the build characteristic of at least one location within the at least one region of interest, the effect determined by a difference between the first simulation and the second simulation using the first build characteristic output and the second build characteristic output;

compare the first build characteristic contribution profile and the second build characteristic contribution profile with respect to the at least one location within the at least one region of interest in the component; and adjust a build parameter for the at least one location within the component relating to the first element of the plurality of elements based on the comparison of the first build characteristic contribution profile and the second build characteristic contribution profile determining that the first element is a primary contributor to the build characteristic and the second element is a secondary contributor to the build characteristic, the build parameter provided to the consolidation device to control operation of the consolidation device according to the build parameter to adjust operation of the consolidation device to build the component with improvement to the build characteristic in the least one region of interest, the consolidation device including a laser device and a scanning device, operation of the consolidation device to be controlled by adjusting an operating setting of the consolidation device, the operating setting including at least one of a power output of the laser device, a position of the scanning device, or a scan speed of the scanning device based on the adjusting of the build parameter.

20. The build characteristic contribution evaluation module in accordance with claim 19, wherein said at least one processor is further programmed to:

generate a plurality of the build characteristic contribution profiles for the plurality of elements;

combine the build characteristic contribution profiles to generate a build characteristic contribution map of the component;

compare the build characteristic contribution profiles of the plurality of elements to each other; and sort the plurality of elements based on the comparison of the build characteristic contribution profiles.

* * * * *